United States Patent
Lerner

[11] 3,892,945
[45] July 1, 1975

[54] ELECTRIC BOTTLE WARMER

[76] Inventor: Robert Lerner, 231 Harbor Hill Road, Roslyn, N.Y. 11576

[22] Filed: July 26, 1973

[21] Appl. No.: 382,828

[52] U.S. Cl............... 219/437; 21/119; 200/85 R; 219/272; 219/295; 219/432; 219/518; 219/521
[51] Int. Cl........ H05b 9/06; F24h 3/06; H05b 1/02
[58] Field of Search .................... 219/271–276, 219/284–295, 385–387, 430, 432, 433, 437, 518, 333, 521, 435, 438, 441, 439, 507; 21/94, 97, 117–119; 200/85 R; 99/330, 331, 440, 441

[56] References Cited
UNITED STATES PATENTS

| | | | |
|---|---|---|---|
| 1,451,636 | 4/1923 | Ullrich | 219/333 X |
| 2,020,364 | 11/1935 | Lehmann | 219/518 |
| 2,158,698 | 5/1939 | Hetinger | 219/271 |
| 2,505,092 | 4/1950 | Brewer | 219/433 X |
| 2,526,447 | 10/1950 | Aiken | 219/433 |
| 2,536,596 | 1/1951 | Fisher | 219/289 |
| 3,347,618 | 10/1967 | McKeown | 219/284 X |
| 3,654,428 | 4/1972 | Talge et al. | 219/288 |

*Primary Examiner*—A. Bartis
*Attorney, Agent, or Firm*—Murray Schaffer

[57] ABSTRACT

An electric bottle warmer for warming small containers, bottles, jars and the like is provided with a pot-like body adapted to be supported on a surface and defining a container receiving interior space having perforated bottom. A cup-shaped vessel adapted to receive a quantity of water is recieved below the perforated bottom. A heating element, which may comprise a pair of spaced electrodes or a resistance heating element of the "Calrod" type, is located within the vessel for heating the water to produce steam which passes through the perforations into the interior space of the body. A normally open water level sensing switch is mounted on the side wall of the vessel and arranged in circuit with the heating element so that the heating element can be energized only in the presence of a predetermined water level in the vessel. A normally open pressure switch in circuit with the heating element and having an actuating plunger adapted to contact the surface on which body is supported is arranged such that the heating element can only be energized when the body is supported in contact with the surface and a container to be heated is received within the interior space.

2 Claims, 4 Drawing Figures

ELECTRIC BOTTLE WARMER

BACKGROUND OF INVENTION

The present invention relates to heating devices and in particular to electrical bottle warmers for baby bottles and the like.

Known heating devices for baby bottles, food containers, jars and the like comprise a vessel like housing adapted to contain a quantity of water and an electrical heating element for boiling the water. The bottle to be heated is placed into the water before or after boiling until the contents are heated. In one type of warmer the electrical heating element is operative only as a result of the conduction of the water and must itself be inserted in the water, while in another known type the electrical element is operative even without the presence of water and is located outside of the vessel. In both types heating is generally quite effective, although a number of disadvantages are inherent in each.

Since direct contact of the bottle container to be heated with water is required, the level of water is such that a substantial portion of the bottle must be immersed in water. As a result, a large quantity of boiling water exists which remains hazardous and dangerous for some time after the bottle is heated. The danger exists that mother or child, for example, may insert their fingers into the boiling water, or tip the vessel over, or place some undesirable object in the vessel. Furthermore, since water is an electrical conductive substance, the possibility exists that through some accident a short occurs, rendering the water electrically dangerous.

Another disadvantage exists in the fact that in either instance, the mere presence of water in the vessel causes the heating element to be operative and therefore even without the insertion of a bottle the device is heating water. In the known devices, it is necessary for the user to remove the electrical cord plug from the source of electricity or manually turn off a switch governing the operation of the device. Consequently, a positive operative step is required on the part of the user, at a time when the user is generally preoccupied with baby, or other more urgent matters.

It is the object of the present invention to provide a heating device of the type described which overcomes and avoids the disadvantages of the prior known devices.

Another object of the present invention is to provide a heating device for baby bottles and the like which is electrically safer than those known heretofore.

It is another object of the present invention to provide a heating device which is inoperative on removal of the bottle.

These objects, others, as well as numerous advantages will be seen from the following disclosure.

SUMMARY OF INVENTION

According to the present invention, a heating device for small containers, bottles, jars and the like is provided comprising an enclosing pot-like body or shell having a perforated bottom wall. Below this perforated wall a second vessel is secured in which is contained a liquid and in which the heating element is fixed. The heating element is in contact only with the liquid in the lower vessel so that no liquid is located in the upper container. The heating element boils the liquid and provides steam which rises through the perforations into contact with the container.

Preferably, the body comprises an outer shell and an inner shell spaced therefrom, and the upper container and lower vessel and heating element are provided as a unitary assembly removably secured to the shell.

In a preferred form of the device a pressure sensitive switch is interposed in the circuit of the heating element, and is mounted so as to react against the table or other supporting surface. The pressure sensitive switch is biased so as to be inoperative to pass current unless a container is situated in the device.

A liquid level sensor and switch is also provided as well as other features all of which are described in detail in the following disclosure and are seen in the attached drawings.

DESCRIPTION OF INVENTION

Figure 1:
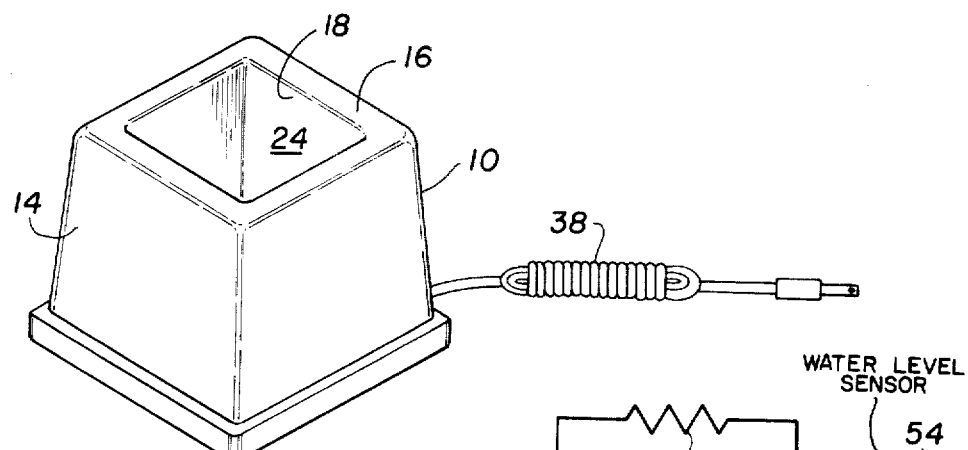
FIG. 1 is a perspective view of a bottle or the like warmer, embodying the present invention.
Figure 4:
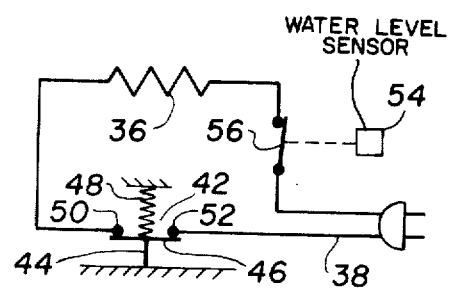
FIG. 4 is a diagram of the electrical circuit of the invention with the heating element shown schematically.
Figure 2:
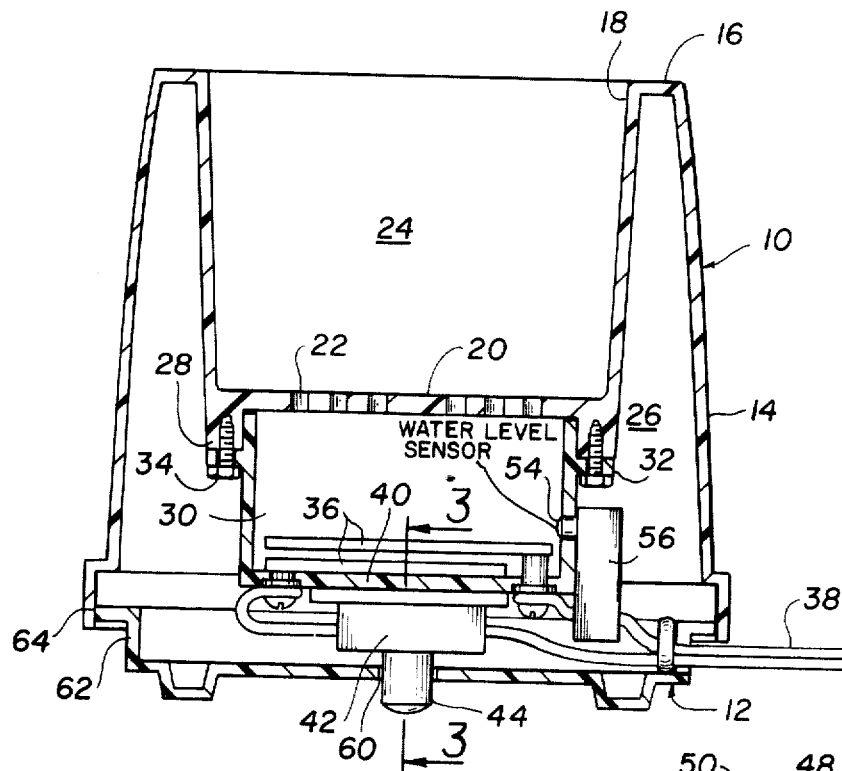
FIG. 2 is a vertical sectional view showing the interior of the device of FIG. 1 and the details of the present invention.

Turning to the drawing, the heating device of the present invention is embodied in a construction comprising a shell like body formed of an upper housing 10 and a lower base 12. The upper housing 12 is made of a unitary or integral construction and comprises a slightly conical outer wall 14, an upper edge 16 and inner depending wall 18 substantially shorter and also spaced from the outer wall 14. The inner wall 18 tapers inwardly from the top and is enclosed by a bottom wall 20 integral with the wall along its entire periphery, and provided with a plurality of holes 22. The bottom wall 20 and the inner wall 18 form a shell defining a space 24 within which a bottle or other container may be lodged. The bottle, etc., being seated or resting on the bottom wall 20. The space 26 between the inner wall and the outer wall defines an air insulator space allowing the device to be handled even when the interior is heated.

The bottom wall 20 is encompassed by a depending lip 28 to which a cup shaped vessel 30 is secured. The upper edge of vessel 30 fits securely within the depending lip 28 and conforms in cross section to it, while a horizontally extending flange 32 abuts against the lower edge of the lip 28 and is firmly and water-tightly secured to it by a plurality of screw fasteners 34. A sealing gasket may be employed between the vessel 30 and the lip 28, although this is not generally necessary with the construction shown.

The cup shaped vessel is adapted to receive a quantity of water in the interior, which is heated by a heating element 36 located along its bottom. The heating element may be a conventional two-plate electrical heater employing the water to complete its conductive circuit, or it may be a self-contained heating element of the "CALROD" type. Both types are generally accepted for this and similar heating uses. A line cord 38 extending from the heating element and is sealed within the wall of the vessel.

Figure 3:
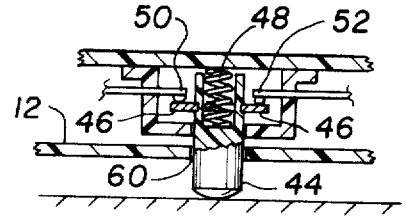
FIG. 3 is a sectional view of a portion of the device taken along line 3—3 of FIG. 2.

Mounted on the exterior bottom wall 40 of the vessel 30 and in series with the circuit of heating element 36 and line cord 38 is a pressure sensitive switch 42. As seen in FIG. 3, the switch may be mechanical device having a vertically depending operating plunger 44, having a contact plate 46. The plunger 44 is loaded by a spring 48 to be normally biased outwardly and its contacts 50 and 52 are so arranged that in this condition the switch is open and no current can pass to the heating element. On the other hand, the depression inwardly or up into the switch of the plunger closes the contacts and passes current activating the heating element.

The strength of the spring 48 is chosen such that when a bottle or other container is not resting or standing on the perforated bottom wall 20 the plunger is urged completely outwardly, notwithstanding the weight of the housing itself. A water level sensor 54 such as a sealed diaphragm is imbedded in the wall of the vessel 30 to contact the water in the interior, and is mechanically connected to a switch 56 also located in series in the heating element circuit.

The plunger 42 extends downwardly along the central axis of the device, through a hole 60 in the base 12. The base is itself a generally flat member having an upward circumferential edge 62 to the cross section of the upper housing 10. The base 12 is adapted to have this edge 62 snap into a groove 64 running continuously along the bottom edge of upper housing 10. The base is provided with a plurality of feet which are spaced to provide stable rest for the device.

As seen, the cross section of the heating device is generally square and although this form is preferred, the heating device may have a generally cylindrical and/or rectangular cross section. The vessel 30 holding the water and heating element could be cylindrical in any event since the interior lip 28 on which it is fastened may be made annular without influencing the outside configuration of the device. The entire structure including the vessel 30 is made from high impact, high temperature resistant moldable plastics, such as Polypropylene or the like. Commercial plastic materials such as Melamine, and Lexan may be preferred because of the superior qualities to resist deformation under heat and impact.

In operation water is inserted within the heating device to filter downwardly into vessel 30, so that the level does not extend above the bottom wall 20. The heating element circuit is closed by the water level sensor and switch, and on insertion of the bottle on the bottom wall 20 the plunger 42 is depressed finally closing the circuit of the heating element. The water boils and the steam rises upwardly against the bottle, heating the bottle to the desired degree. On removal of the bottle the plunger 42 rises disconnecting the heating element. Should an excess amount of water be initially found in the vessel, so that its weight in the housing body maintains the plunger 42 depressed, heating of the water continues only temporarily until sufficient water evaporates to lighten the weight of the device. Further, on evaporation of substantially all the water, the level sensor itself disconnects the heating element.

Numerous advantages of the present invention can now be seen. Firstly, the heating medium is steam, not hot water. The bottle or other container is separated from the water and is contacted solely by the rising steam. Thus, the danger of a glass bottle breaking or inserting it into boiling water is eliminated. Further, the user, be it mother or child, will not come into contact with the boiling water or "electrically conductive water," on inserting or removing the bottle. Secondly, all the water is contained in a vessel which is isolated from all contact with the user, so that it cannot be touched or little fingers gotten into it at all. The bottom wall, having only small perforations, further prevents metallic objects, utensils, etc., from falling into contact with the heating element and thus shorting out the circuit. Both these advantages, render the heating device extremely safe and in greater conformity with the diseratum and standards set by the "Underwriter's Code."

The pressure switch provides a further safety feature not found on prior devices. Namely, it prevents operation without a bottle or container to be heated. Preferably, as indicated, the spring loaded plunger will only activate the element when a fully loaded bottle is inserted, and not otherwise. The pressure switch will also act to disconnect the heating element immediately in the event the device is tipped over, or not properly seated on the table or work surface, providing another automatic safety feature.

Another advantage arises from the construction of the vessel 30 and its heating element, and electrically circuitry. Since this entire assembly is unitarily molded to form an integral arrangement, it may be easily replaced in its entirety should any component fail. This initial construction and subsequent repair is made less expensive. The body of the device itself is made of only two parts, the upper housing and the base and is therefore lightweight, compact and inexpensively fabricated.

Many other advantages will come to mind to those skilled in this art, as will numerous modifications and changes. It is, therefore, intended that the present disclosure be taken as illustrative only and not limiting of the present invention.

What is claimed is:

1. A heating device for bottles and the like, comprising an enclosing body adapted to be supported on a surface and defining an interior space for receiving said bottle, said body having a perforated bottom wall, a cup-shaped vessel, having unitarily formed bottom and side walls, for receiving a given quantity of liquid, removably mounted to depend below said perforated bottom and an electric heating element located within said vessel for heating said liquid to produce steam to pass through said perforations into contact with said container, a liquid sensing switch mounted on a side wall of said vessel above the bottom wall, said liquid sensing switch having a normally open position and an operable closed position in series with said electric heating element, said switch being responsive to the presence of liquid in said vessel to be rendered in closed position, a pressure switch having open and closed positions in series with said heating element to control said heating element, said switch being mounted to depend below said vessel and having a switch actuating plunger member extending outwardly of said body into contact with the surface on which it is supported, spring means resiliently biasing said plunger in switch open position, said spring means being sufficient to maintain said plunger in open position on receipt of said quantity of liquid in said vessel and while being free of a bottle, but being overcome on introduction of a bottle into said body.

2. The device according to claim 1 wherein said body comprises an outer shell and an inner shell spaced therefrom, said perforated bottom wall being formed on said inner shell, said liquid vessel being mounted in liquid tight engagement to said inner shell.

* * * * *